(12) United States Patent
Phillips (10) Patent No.: US 9,162,830 B2
(45) Date of Patent: Oct. 20, 2015

(54) PLUG RESISTANT NOZZLE FOR FLUIDIZATION OF PARTICULATES

(75) Inventor: William E. Phillips, Houston, TX (US)

(73) Assignee: KELLOGG BROWN & ROOT LLC, Houston, TX (US)

( * ) Notice: Subject to any disclaimer, the term of this patent is extended or adjusted under 35 U.S.C. 154(b) by 862 days.

(21) Appl. No.: 12/975,622

(22) Filed: Dec. 22, 2010

(65) Prior Publication Data

US 2012/0163928 A1    Jun. 28, 2012

(51) Int. Cl.
    B65G 53/30    (2006.01)
    B65G 53/42    (2006.01)
    B65G 53/16    (2006.01)

(52) U.S. Cl.
    CPC ............... *B65G 53/42* (2013.01); *B65G 53/16* (2013.01)

(58) Field of Classification Search
    USPC ............ 406/45, 181, 191, 194, 198; 138/89
    See application file for complete search history.

(56) References Cited

U.S. PATENT DOCUMENTS

| | | | |
|---|---|---|---|
| 3,848,624 A | 11/1974 | Banike | |
| 3,860,039 A * | 1/1975 | Ells | 138/103 |
| 4,155,372 A * | 5/1979 | Mills et al. | 137/1 |
| 4,203,391 A | 5/1980 | Knoebel et al. | |
| 4,322,291 A * | 3/1982 | Ho | 210/181 |
| 4,497,599 A | 2/1985 | Benatar et al. | |
| 4,513,788 A * | 4/1985 | Coker et al. | 138/89 |
| 4,775,267 A * | 10/1988 | Yamamoto | 406/50 |
| 5,372,791 A | 12/1994 | Abdulally | |
| 5,704,387 A * | 1/1998 | Sims | 137/263 |
| 5,754,613 A * | 5/1998 | Hashiguchi et al. | 376/378 |
| 6,624,266 B2 | 9/2003 | Terry et al. | |
| 6,972,114 B2 | 12/2005 | Pope et al. | |
| 7,527,044 B2 * | 5/2009 | Dunkle et al. | 123/519 |
| 7,771,585 B2 | 8/2010 | Vimalchand et al. | |
| 8,066,789 B2 | 11/2011 | Liu et al. | |
| 8,303,696 B2 | 11/2012 | Vimalchand et al. | |
| 8,308,836 B2 | 11/2012 | Liu et al. | |
| 8,689,709 B2 | 4/2014 | Vimalchand et al. | |
| 8,852,303 B2 | 10/2014 | Vimalchand et al. | |
| 8,920,736 B2 | 12/2014 | Liu | |
| 2002/0066774 A1 * | 6/2002 | Prochac | 228/212 |
| 2004/0100902 A1 | 5/2004 | Vimalchand et al. | |
| 2004/0107638 A1 | 6/2004 | Graham et al. | |
| 2004/0231675 A1 * | 11/2004 | Lyons | 128/207.18 |
| 2006/0014894 A1 * | 1/2006 | Torii et al. | 524/801 |
| 2007/0267025 A1 * | 11/2007 | Lyons et al. | 128/207.18 |
| 2008/0216655 A1 | 9/2008 | Vimalchand et al. | |
| 2008/0272057 A1 * | 11/2008 | Tontegode | 210/739 |
| 2009/0304465 A1 * | 12/2009 | Greenwood et al. | 406/192 |
| 2010/0089457 A1 * | 4/2010 | Batard et al. | 137/1 |
| 2010/0263342 A1 | 10/2010 | Liu et al. | |
| 2010/0266460 A1 | 10/2010 | Liu et al. | |
| 2010/0269411 A1 | 10/2010 | Goetsch et al. | |
| 2011/0005395 A1 | 1/2011 | Vimalchand et al. | |
| 2011/0146152 A1 | 6/2011 | Vimalchand et al. | |

(Continued)

*Primary Examiner* — Joseph Dillon, Jr.
(74) *Attorney, Agent, or Firm* — Gary M. Machetta (57) ABSTRACT

Apparatus, systems, and methods for fluidizing particulates in a fluid/particulate mixture. A nozzle can include a gas entry segment, a gas exit segment, and an access segment. The gas exit segment can be coupled to the gas entry segment, and a longitudinal axis of the gas exit segment can be oriented at an angle of between about 70° and about 110° with respect to a longitudinal axis of the gas entry segment. The access segment can be coupled to the gas entry segment and the gas exit segment, and a longitudinal axis of the access segment can be substantially aligned with the longitudinal axis of the gas exit segment.

21 Claims, 3 Drawing Sheets

(56) References Cited

U.S. PATENT DOCUMENTS

| | | |
|---|---|---|
| 2011/0146153 A1 | 6/2011 | Vimalchand et al. |
| 2012/0031584 A1 | 2/2012 | Vimalchand et al. |
| 2012/0175872 A1 * | 7/2012 | Lindsey et al. ............... 285/189 |
| 2012/0216680 A1 | 8/2012 | Vimalchand et al. |
| 2013/0055936 A1 | 3/2013 | Vimalchand et al. |
| 2013/0145934 A1 | 6/2013 | Liu et al. |
| 2014/0008580 A1 | 1/2014 | Liu et al. |
| 2014/0054011 A1 | 2/2014 | Liu et al. |
| 2014/0158941 A1 | 6/2014 | Liu et al. |

* cited by examiner

FIG. 5

PLUG RESISTANT NOZZLE FOR FLUIDIZATION OF PARTICULATES

BACKGROUND

1. Field

Embodiments described generally relate to nozzles for fluidizing particulates. More particularly, such embodiments relate to plug resistant nozzles for fluidizing particulates.

2. Description of the Related Art

Gasification is a high temperature process usually conducted at elevated pressure to convert carbon-containing materials into carbon monoxide and hydrogen gas. Since this gas is often used for the synthesis of chemicals or synthetic hydrocarbon fuels, the gas is often referred to as "synthesis gas" or "syngas." Syngas can be used as a fuel to generate electricity or steam and as a source of hydrogen.

During the gasification process, a fluid/particulate mixture flows through one or more fluid conveying structures in a gasifier. The fluid conveying structures typically include a pressure shell and a refractory layer disposed on an inner surface of the pressure shell. Conventional nozzles extend through the pressure shell and the refractory layer and introduce a fluid, e.g., a gas, into the fluid/particulate mixture to fluidize the particulates so that they will continue to flow through the fluid conveying structure.

When the gasification process experiences interruptions, such as an unscheduled shutdown, however, the fluid introduced via the nozzles can be stopped. This can allow the particulates in the fluid conveying structure to descend to the inner surface of the refractory layer, where the particulates tend to accumulate in the nozzles. When the particulates accumulate in the nozzles, it is desirable to blow the particulates out of the nozzles rather than rodding or drilling them out, as the rodding and drilling procedures are significantly more time consuming. However, since conventional nozzles must be long enough to extend through the pressure shell and the refractory layer, the particulate blockage tends to be too great to blow out.

There is a need, therefore, for improved systems and methods for fluidizing particulates in a gasifier while resisting significant nozzle build-up.

DETAILED DESCRIPTION

Apparatus, systems, and methods for fluidizing particulates in a fluid/particulate mixture are provided. A nozzle can include a gas entry segment, a gas exit segment, and an access segment. The gas exit segment can be coupled to the gas entry segment, and a longitudinal axis of the gas exit segment can be oriented at an angle of between about 70° and about 110° with respect to a longitudinal axis of the gas entry segment. The access segment can be coupled to the gas entry segment and the gas exit segment, and a longitudinal axis of the access segment can be substantially aligned with the longitudinal axis of the gas exit segment.

Figure 1:
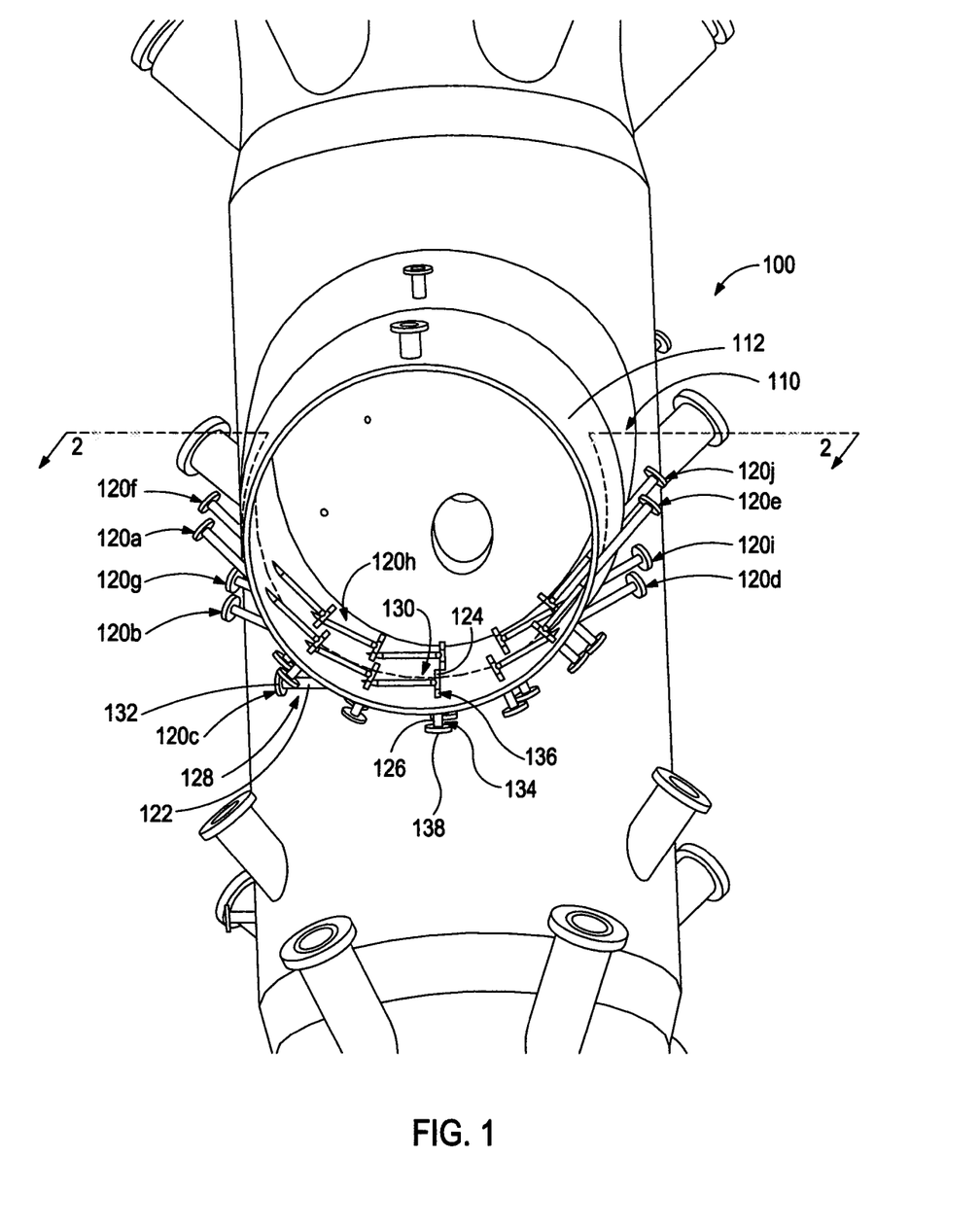
FIG. 1 depicts an isometric view of an illustrative fluid conveying structure having a plurality of illustrative nozzles coupled thereto, according to one or more embodiments described.

FIG. 1 depicts an isometric view of an illustrative fluid conveying structure 110 having a plurality of illustrative nozzles 120a-j coupled thereto, according to one or more embodiments. The fluid conveying structure 110 can be a pipe, conduit, tube, channel, or any other suitable structure configured to transport a fluid/particulate mixture (not shown) therethrough. The fluid conveying structure 110 can include a pressure shell 112 having any suitable cross-sectional shape. For example, the cross-sectional shape of the pressure shell 112 can be circular, elliptical, ovular, rectangular, or the like. In one or more embodiments, the fluid conveying structure 110 can be used in any application involving a fluid/particulate mixture. For example, the fluid conveying structure 110 can be one or more conduits in a gasifier 100, such as a coal gasifier. In another example, the fluid conveying structure 110 can be a particulate transfer line, such as a coal transfer line. In another example, the fluid conveying structure 110 can be one or more conduits in a catalytic cracking system, such as a catalyst transfer line in a fluidized catalytic cracker. In one or more embodiments, the fluid conveying structure 110 can be horizontal, vertical, or disposed at any angle therebetween.

One or more nozzles (ten are shown: 120a-j) can be coupled to the fluid conveying structure 110. The nozzles 120a-j can be configured to introduce a fluid, e.g., a gas, to the fluid/particulate mixture to fluidize the particulates, e.g. solids, so the particulates can flow through the fluid conveying structure 110. In one or more embodiments, the particulates can include carbonaceous materials, coal, biomass, iron ore, catalyst particles, ash, ceramic materials, sand, polymer materials, or the like. Each nozzle 120a-j can include a gas entry segment 122, a gas exit segment 124, and an access segment 126. The segments 122, 124, 126 can include a flow path therethrough. For example, the segments 122, 124, 126 can be hollow or otherwise have a bore therethrough. The gas entry segment 122 can extend from a first or outer end 128, located outside the pressure shell 112, through the pressure shell 112, and to a second or inner end 130, located inside the pressure shell 112. The first end 128 can have n flange 132 coupled thereto and the second end 130 can be coupled to the gas exit segment 124 and the access segment 126. Depending on the particular location of a given nozzle 120a-j, the first end 128 can be at the same height, above, or below the second end 130, with respect to horizontal. As shown in FIG. 1, the first ends 128 of the nozzles 120a-j can be arranged at the some height as or above the second ends 130, with respect to horizontal. The length of the gas entry segment 122 can range from a low of about 10 cm, about 15 cm, or about 20 cm, to a high of about 50 cm, about 100 cm, or about 200 cm. The inner cross-sectional width or average inner cross-sectional width, e.g., an inner diameter, of the gas entry segment 122 can range from a low of about 0.25 cm, about 0.5 cm, or about 1 cm to a high of about 5 cm, about 10 cm, or about 15 cm.

The gas exit segment 124 can be coupled to the gas ent segment 122 and the access segment 126 and extend from the longitudinal axis of the gas entry segment 122 into the fluid conveying structure 110. The length of the gas exit segment 124 can range from a low of about 1 cm, about 2 cm, or about 4 cm, to a high of about 20 cm, about 40 cm, or about 60 cm.

For example, the length of the gas exit segment 124 can be about 15 cm. The inner cross-sectional width of the gas exit segment 124 can range from a low of about 0.25 cm, about 0.5 cm, or about 1 cm to a high of about 5 cm, about 10 cm, or about 15 cm. In one or more embodiments, a ratio of the length of the gas exit segment 124 to the inner cross-sectional width of the gas exit segment 124 can be about 12:1, about 10:1, about 8:1, about 6:1, about 4:1, about 2:1, or about 1:1. In one or more embodiments, a ratio of the length of the gas exit segment 124 to the inner cross-sectional width of the gas exit segment 124 can be less than about 12:1, less than about 10:1, less than about 8:1, less than about 6:1, less than about 4:1, less than about 2:1, or less than about 1:1.

The access segment 126 can be substantially aligned with the gas exit segment 124 and can extend from a first or outer end 134, located outside the pressure shell 112, through the pressure shell 112, and to a second or inner end 136, located inside the pressure shell 112. The first end 134 can have a flange 138 coupled thereto, and the second end 136 can be coupled to the gas entry segment 122 and the gas exit segment 124. In one or more embodiments, the flange 138 can be a blind flange configured to close the first end 134 of the access segment 126. In one or more embodiments, a removable plug or stopper 133 can be at least partially disposed within the access segment 126. For example, a removable plug or stopper 133 can be disposed within the access segment 126 from the first end 134 to the second end 136. The length of the access segment 126 can range from a low of about 10 cm, about 20 cm, or about 30 cm, to a high of about 50 cm, about 100 cm, or about 150 cm. The inner cross-sectional width of the access segment 126 can range from a low of about 0.25 cm, about 0.5 cm, or about 1 cm to a high of about 5 cm, about 10 cm, or about 15 cm.

Although the nozzles 120a-j are shown in two rows of five, i.e., 120a-e and 120f-j, any number of rows may be used, and any number of nozzles 120a-j may be located in each row. For example the number of rows can range anywhere from one to tens, or hundreds, or thousands. The number of nozzles can also range anywhere from one to tens, or hundreds, or thousands. The nozzles 120a-j can be made from any suitable metal, metal alloy, composite materials, polymeric materials, or the like. For example, the nozzles 120a-j can be made from a metal alloy including, but not limited to nickel, iron, chromium, cobalt, silicon, manganese, molybdenum, titanium, carbon, tungsten, and columbium. In another example the nozzles 120a-j can be made from steel alloys such as 310SS, 304SS, 800H, Haynes 120, Haynes 160, Haynes 556, low chrome alloys, carbon steel, or the like. The nozzles 120a-j can be designed to withstand a pressure ranging from a low of about 3,000 kPa, about 5,000 kPa, or about 10,000 kPa to a high of about 20,000 kPa, about 40,000 kPa, about 60,000 kPa, or about 70,000 kPa. For example, the nozzles 120a-j can be designed to withstand a pressure from about 11,000 kPa to about 19,000 kPa, about 13,000 kPa to about 17,000 kPa, or about 8,000 kPa to about 22,000 kPa.

Figure 2:
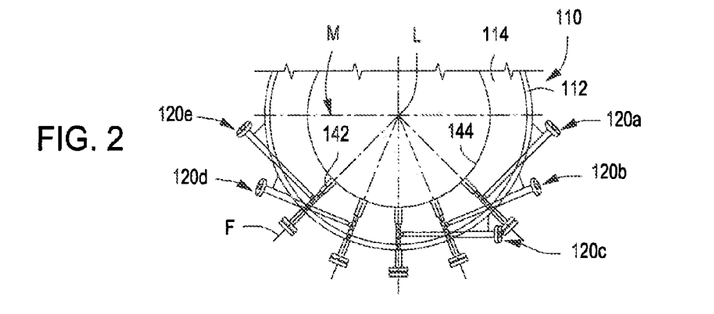
FIG. 2 depicts a partial cross-sectional view of the fluid conveying structure and nozzles depicted in FIG. 1 taken along line 2-2, according to one or more embodiments described.
Figure 3:
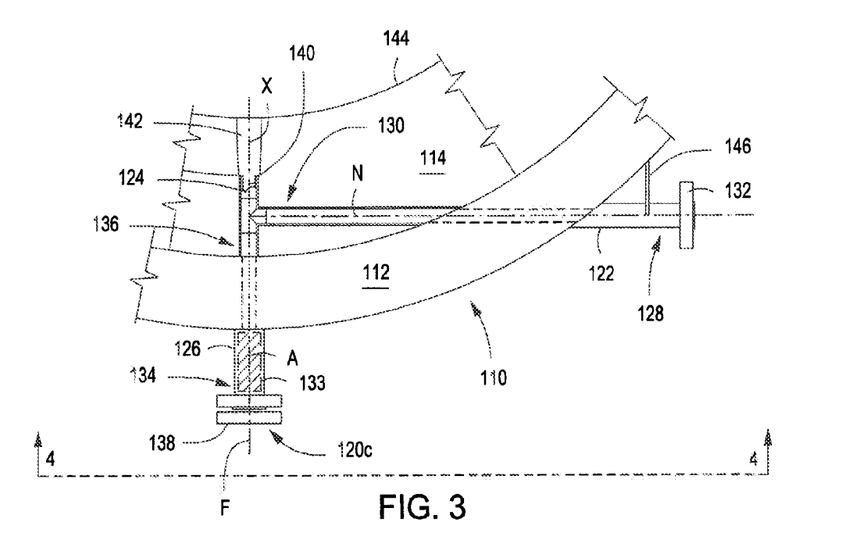
FIG. 3 depicts a close up partial cross-sectional view of a nozzle depicted in FIG. 2, according to one or more embodiments described.

FIG. 2 depicts a partial cross-sectional view of the fluid conveying structure 110 and nozzles 120a-e depicted in FIG. 1 taken along line 2-2, and FIG. 3 depicts a close up cross-sectional view of nozzle 120c depicted in FIG. 2, according to one or more embodiments. Referring to FIGS. 2 and 3 with continuing reference to FIG. 1, the fluid conveying structure 110 can include one or more refractory layers (one is shown) 114 disposed on an inner surface of the pressure shell 112. The refractory layer 114 can be made from aluminum oxide, silicon oxide, magnesium oxide, combinations thereof, or the like. In one or more embodiments, the depth of the refractory layer 114 can range from a low of about 1 cm, about 2 cm, or about 4 cm to a high of about 10 cm, about 30 cm, or about 50 cm. For each nozzle 120a-j, the second end 130 of the gas entry segment 122, the second end 136 of the access segment 126, and the gas exit segment 124 can be disposed within the refractory layer 114.

In one or more embodiments, the innermost end 140 of the gas exit segment 124 can be flush with the inner surface 144 of the refractory layer 114. In one or more embodiments, the innermost end 140 of the gas exit segment 124 does not extend to the inner surface 144 of the refractory layer 114. Rather, the refractory layer 114 can define a hole 142 that extends from the innermost end 140 of the gas exit segment 124 to the inner surface 144 of the refractory layer 114 and is flush therewith. As such, the hole 142 can provide a flow path from the gas exit segment 124 to the fluid/particulate mixture in the fluid conveying structure 110. In another example, the innermost end 140 can extend past the inner surface 144 of the refractory layer 114 and within an internal volume of the fluid conveying structure 110.

In one or more embodiments, a longitudinal axis N of the gas entry segment 122 can be oriented between about 60° and about 120° with respect to a longitudinal axis X of the gas exit segment 124 and/or a longitudinal axis A of the access segment 126, between about 70° and about 110° with respect to the longitudinal axis X of the gas exit segment 124 and/or the longitudinal axis A of the access segment 126, or between about 80° and about 100° with respect to the longitudinal axis X of the gas exit segment 124 and/or the longitudinal axis A of the access segment 126. For example, the longitudinal axis N of the gas entry segment 122 can be oriented at an angle ranging from a low of about 60°, about 65°, about 70°, about 75°, or about 80° to a high of about 95°, about 100°, about 105°, about 110°, or about 115° with respect to the longitudinal axis X of the gas exit segment 124 and/or the longitudinal axis A of the access segment 126. In another example, the longitudinal axis N of the gas entry segment 122 can be oriented at about 90° with respect to the longitudinal axis X of the gas exit segment 124 and the longitudinal axis A of the access segment 126 and form a "T" shape. In one or more embodiments, one or more gussets 146 can be coupled to the gas entry segment 122 and the pressure shell 112. The one or more gussets 146 can support the gas entry segment 122 as it extends away from the pressure shell 112.

The first end 128 of the gas entry segment 122 can be located level with or above the second end 130 of the gas entry segment 122, with respect to horizontal. In one or more embodiments, the longitudinal axis N of the gas entry segment 122 can be oriented between about 0° and 60°, with respect to horizontal. As shown, the gas entry segment 122 of nozzle 120c can be horizontal, the gas entry segments 122 of nozzles 120b,d can be oriented at about 22.5° with respect to horizontal, and the gas entry segments 122 of nozzles 120a,e can be oriented at about 45° with respect to horizontal. However, as may be appreciated, the number and angles of the gas entry segments 122 can widely vary based on the particular application and/or configuration of the pressure shell 112, for example.

The longitudinal axis A of the access segment 126 and the longitudinal axis X of the gas exit segment 124 of each nozzle 120a-j, and the corresponding holes 142 defined by the refractory layer 114, can be aligned and have an axis "F" extending therethrough. As shown, each axis F extends generally through a longitudinal axis "L" of the fluid conveying structure 110. For example, the axis F through nozzle 120c can be vertical, the axes F through nozzles 120b,d can be oriented at about 22.5° with respect to vertical, and the axes F through nozzles 120a,e can be oriented at about 45° with respect to vertical. However, as may be appreciated, each axis F can be oriented between about 0° and about 60° with respect to vertical. The angle between any two adjacent axes F can range from a low of about 5°, about 10°, or about 15° to a high of about 30°, about 40°, or about 50°. Although not shown, in one or more embodiments, one or more of the axes F can be oriented such that they do not extend generally through the longitudinal axis L.

The longitudinal axis L of the fluid conveying structure 110 can be oriented at any angle between and including horizontal and vertical. In non-vertically oriented fluid conveying structures 110, such as the horizontally oriented fluid conveying structure 110 shown in FIG. 1, the gas exit segments 124 can be disposed in a lower portion of the fluid conveying structure 110. As used herein, "lower portion" refers to the portion of the fluid conveying structure 110, pressure shell 112, and/or refractory layer 114 that is below the line "M," which extends horizontally through the center of the cross-sectional view shown in FIG. 2.

Figure 4:
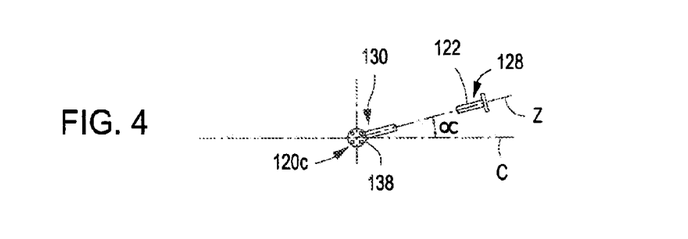
FIG. 4 depicts a view of the nozzle in FIG. 3 taken along line 4-4, according to one or more embodiments described.

FIG. 4 depicts a cross-sectional view of the nozzle 120c in FIG. 3 taken along line 4-4, according to one or more embodiments. Referring to FIG. 4, with continuing reference to FIGS. 1-3, the nozzle plane "Z" extending through the gas entry segment 122 and the access segment 126 (and the gas exit segment 124) can be oriented at an angle "α" with respect to a cross-sectional plane "C," which is perpendicular to the axis L extending longitudinally through the fluid conveying structure 110. In one or more embodiments, the angle α can range, in either direction with respect to the cross-sectional plane C, from a low of about 0°, about 2°, about 6°, or about 10° to a high of about 20°, about 30°, or about 40°. For example, the angle α can range from about 3° to about 37°, about 2° to about 15°, about 5° to about 25°, about 8° to about 22°, about 1° to about 33°, or about 10° to about 20°. As can best be seen in FIG. 1, the angle α can prevent the gas entry segment 122 of one nozzle 120a-j from intersecting with the access segment 126 of a different, adjacent nozzle 120a-j.

In operation, the fluid/particulate mixture (not shown) can flow through the fluid conveying structure 110. A fluid supply (not shown) coupled to the flange 132 at the first end 128 of the gas entry segment 122 can introduce a process fluid, e.g., a gas, liquid, or combination thereof, into the gas entry segment 122. In one or more embodiments, the process fluid can be or include, but is not limited to air, steam, water, nitrogen, recycled gases, syngas, carbon dioxide, carbon monoxide, or the like. Other suitable process fluids can include, but are not limited to, hydrocarbon gases such as methane, ethane, ethylene, propane, propylene, butane, butene, or any combination thereof. The process fluid can flow through the gas entry segment 122, the gas exit segment 124, and, if the refractory is present, the hole 142, to the fluid/particulate mixture in the fluid conveying structure 110. The process fluid can fluidize the particulates in the fluid/particulate mixture so that the particulates continue to flow through the fluid conveying structure 110 rather than settling on the inner surfaces of the refractory layer 114.

When the nozzles 120a-j stop introducing the process fluid to the fluid/particulate mixture in the fluid conveying structure 110, the particulates can descend through the mixture and settle on the bottom of the fluid conveying structure 110. Accordingly, some of the particulates can descend through the hole 142 and into the gas exit segment 124. If enough particulates accumulate in the hole 142 and/or gas exit segment 124, the particulates can plug or block the hole 142 and/or the gas exit segment 124 so that the process fluid will be unable to flow therethrough when it is turned back on. However, since the first end 128 of the gas entry segment 122 can be located level with or above the second end 130 of the gas entry segment 121 with respect to horizontal, the gas entry segment 122 can be resistant to plugging or blocking by the particulates, as the particulates are not likely or at least less likely to flow sideways or in an upward direction. In one or more embodiments, a removable plug or stopper 133 can be disposed within the access segment 126, such as from the first end 134 to the second end 136, to prevent the particulates from descending into the access segment 126.

When a particulate blockage becomes disposed in the hole 142 and/or the gas exit segment 124, the blockage can be ejected back into the fluid/particulate mixture. When the blockage is not too severe, a fluid supply can be coupled to the first end 128 of the gas entry segment 122 and/or the first end 134 of the access segment 126, and an ejection fluid can be introduced to blow the blockage back into the fluid/particulate mixture. Illustrative ejection fluids can be or include the same fluids or similar fluids as the process fluid or different fluids. When the blockage is severe, however, the blowing process may be unable to exert enough force to eject the blockage. When this occurs, a rod can be inserted by hand or machine into the access segment 126 to eject the blockage. In another embodiment, a drill bit can be inserted into the access segment 126, and the blockage can be drilled out. As may be appreciated, however, ejecting the blockage by rod or drill can be much more time consuming than the more simple blowing process.

Among other factors, the severity of the particulate blockage can correspond to the ratio between the length and the inner cross-sectional width of the gas exit segment 124 and/or the hole 142. It is more likely that the blockage can be blown out when the length to width ratio is less than about 12:1. Since the length to width ratio of the gas exit segment 124 and/or the hole 142 can be less than about 12:1, any blockage that occurs in the gas exit segment 124 and/or the hole 142 can most likely be ejected by the more simple blowing process.

Figure 5:
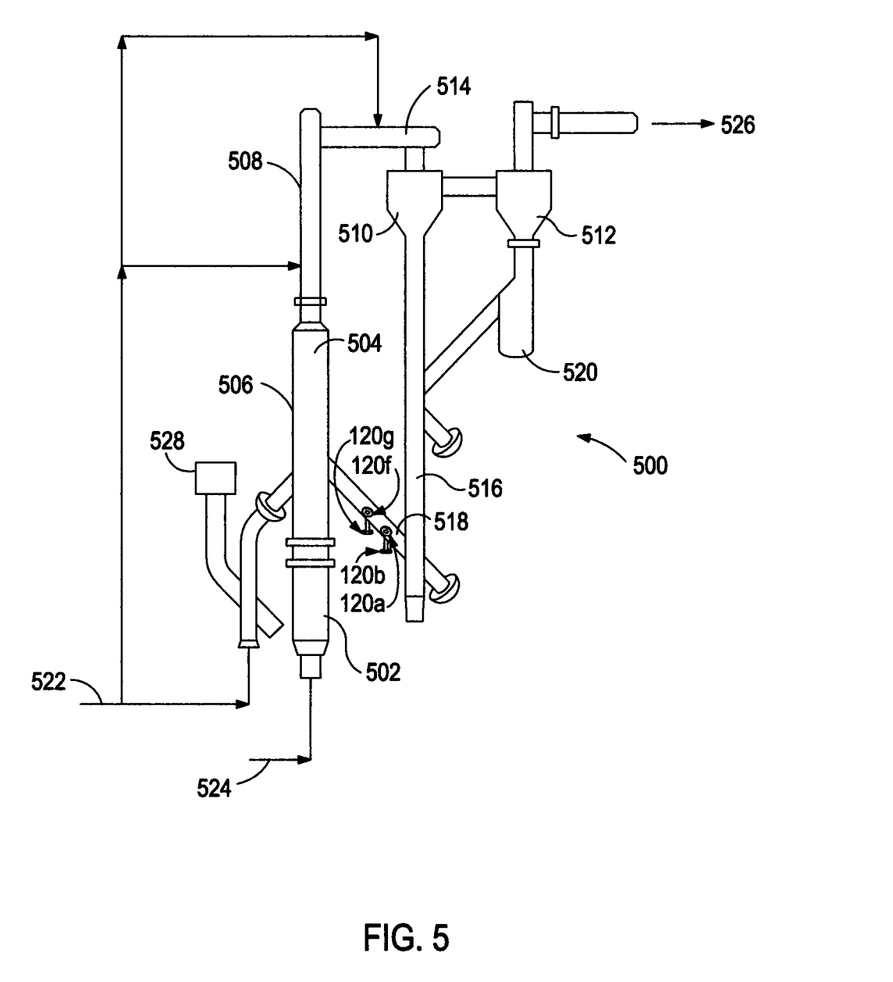
FIG. 5 depicts an illustrative gasifier having a plurality of illustrative nozzles coupled thereto, according to one or more embodiments described.

FIG. 5 depicts an illustrative gasifier 500 having a plurality of illustrative nozzles 120a,b,f,g coupled thereto, according to one or more embodiments. The gasifier 500 can include one or more independent reactor trains arranged in series or parallel. Each independent reactor train can include one or more oxidizing zones 502, oxygen depleted zones 504, mixing zones 506, risers 508, and disengagers 510, 512. Each reactor train can be operated independently or operated where any of the one or more oxidizing zones 502, oxygen depleted zones 504, mixing zones 506, risers 508, disengagers 510, 512 can be shared. For simplicity and ease of description, embodiments of the gasifier 500 will be further described in the context of a single reactor train.

One or more feedstocks via line 522 and one or more oxidants via line 524 can be introduced to the gasifier 500 to produce a raw syngas stream 526. In one or more embodiments, at least of a portion of the feedstock via line 522 can be introduced to the oxygen depleted zone 504, riser 508, and/or transition line 514. Although not shown, at least a portion of the feedstock via line 522 and the oxidant via line 524 can be combined in the mixing zone 506 to provide a gas mixture, which can be combusted to provide heat. In one or more embodiments, the feedstock and oxidant can be injected separately to the mixing zone 506 or mixed (not shown) prior to injection into the mixing zone 506. In one or more embodiments, the feedstock and oxidant can be injected sequentially or simultaneously into the gasifier 500. Introduction of the feedstock via line 522 and oxidant via line 524 to the gasifier 500 can be continuous or intermittent depending on desired product types and grades.

The term "feedstock" as used herein refers to a raw material, whether solid, gas, or liquid. For example, the feedstock via line 522 can include one or more carbonaceous materials. In one or more embodiments, the carbonaceous materials can include, but are not limited to biomass (i.e., plant and/or animal matter or plant and/or animal derived matter); coal (high-sodium and low-sodium lignite, lignite, subbituminous, and/or anthracite, for example); oil shale; coke; tar: asphaltenes: low ash or no ash polymers; hydrocarbon-based polymeric materials; biomass derived material; or by-product derived from manufacturing operations. The hydrocarbon-based polymeric materials can include, for example, thermoplastics, elastomers, rubbers, polypropylenes, polyethylenes, polystyrenes, other polyolefins, homo polymers, copolymers, block copolymers, and blends thereof, PET (polyethylene terephthalate), poly blends, poly-hydrocarbons containing oxygen, heavy hydrocarbon sludge and bottoms products from petroleum refineries and petrochemical plants such as hydrocarbon waxes, blends thereof, derivatives thereof, and combinations thereof.

In one or more embodiments, the feedstock via line 522 can include a mixture or combination of two or more carbonaceous materials. In one or more embodiments, the feedstock can include a mixture or combination of two or more low ash or no ash polymers, biomass derived materials, or by-products derived from manufacturing operations. In one or more embodiments, the feedstock can include one or more recycled plastics such as polypropylene, polyethylene, polystyrene, derivatives thereof, blends thereof, or any combination thereof. Accordingly, the process can be useful for accommodating mandates for proper disposal of previously manufactured materials.

In one or more embodiments, the feedstock via line 522 can be a dry feed or conveyed to the gasifier 500 as a slurry or suspension. In one or more embodiments, the feedstock can be dried, for example to 18% moisture, and then pulverized by milling units such as one or more parallel bowl mills prior to feeding to the gasifier 500. In one or more embodiments, the feedstock can have an average particle size of from about 10 microns to about 500 microns, from about 100 microns to about 400 microns, or from about 200 microns to about 300 microns.

Suitable oxidants in line 524 can include, but are not limited to, air; oxygen; essentially oxygen; oxygen-enriched air; mixtures of oxygen and air; mixtures of oxygen and inert gas such as nitrogen and argon; hydrogen peroxide, ozone, or any combination thereof. In one or more embodiments, the oxidant can contain about 65 vol % oxygen or more, about 70 vol % oxygen or more, about 75 vol % oxygen or more, about 80 vol % oxygen or more, about 85 vol % oxygen or more, about 90 vol % oxygen or more, about 95 vol % oxygen or more, or about 99 vol % oxygen or more. As used herein, the term "essentially oxygen" refers to air containing 51 vol % oxygen or more. As used herein, the term "oxygen-enriched air" refers to air containing 21 vol % oxygen or more. Oxygen-enriched air and/or essentially oxygen can be obtained, for example, from cryogenic distillation of air, pressure swing adsorption, membrane separation, or any combination thereof.

In one or more embodiments, the oxidant via line 524 can be nitrogen-free or essentially nitrogen-free. By "essentially nitrogen-free," it is meant that the oxidant via line 524 contains about 5 vol % nitrogen or less, about 4 vol % nitrogen or less, about 3 vol % nitrogen or less, about 2 vol % nitrogen or less, or about 1 vol % nitrogen or less.

In one or more embodiments, the oxidant via line 524 can be introduced into the mixing zone 506 at a rate suitable to control the temperature of the mixing zone 506. In one or more embodiments, the molar ratio of the oxidant to carbon can be maintained at a sub-stoichiometric ratio to favor the formation of carbon monoxide over carbon dioxide in the mixing zone 506. In one or more embodiments, the oxygen introduced via line 524 to the mixing zone 506 can be less than five percent of the stoichiometric amount of oxygen required for complete combustion of all the carbon supplied to the mixing zone 506. Excess oxygen and steam in the air can be consumed by the recirculating solids stabilizing reactor temperature during operation and periods of feed interruption if any.

One or more sorbents can also be added to the gasifier 500. In one or more embodiments, the sorbents can be added to capture contaminants from the syngas, such as sodium vapor in the gas phase within the gasifier 500. In one or more embodiments, the sorbents can be added to scavenge oxygen at a rate and level sufficient to delay or prevent the oxygen from reaching a concentration that can result in undesirable side reactions with hydrogen (e.g., water) from the feedstock within the mixing zone 506. In one or more embodiments, the sorbents can be used to dust or coat feedstock particulates in the gasifier to reduce the tendency for the particulates to agglomerate. In one or more embodiments, the oxidant via line 524 can be introduced at the bottom of the mixing zone 506 to increase the temperature within the mixing zone 506 and riser 508 by combusting any carbon contained within the recirculated particulates to form an ash ("char"). In one or more embodiments, the sorbents can be ground to an average particle size of about 5 microns to about 100 microns, or about 10 microns to about 75 microns. Illustrative sorbents can include, but are not limited to, carbon rich ash, limestone, dolomite, and coke breeze. Residual sulfur released from the feedstock can be captured by native calcium in the feed or by a calcium based sorbent to form calcium sulfide.

The residence time and temperature in the gasifier 500 can be sufficient for water-gas shift reaction to reach equilibrium. For example, the residence time of the feedstock in the mixing zone 506 can be greater than about 2 seconds, about 5 seconds, or about 10 seconds. In one or more embodiments, the operating temperature of the gasifier 500 can range from a low of about 260° C., about 400° C., or about 540° C. to a high of about 650° C., about 820° C., or about 980° C. In one or more embodiments, the operating temperature of the gasifier 500 can range from about 370° C. to about 950° C., about 480° C. to about 870° C., or about 650° C. to about 870° C.

In one or more embodiments, the gasifier 500 can be operated within a temperature range sufficient to not melt the ash, such as from about 560° C. to about 1,040° C., or from about 840° C. to about 930° C. Heat can be supplied by burning the carbon in the recirculated solids in the lower part of the mixing zone 506 before recirculated solids contact the entering feedstock. In one or more embodiments, start-up can be initiated by bringing the mixing zone 506 to a temperature from about 510° C. to about 650° C. and optionally by feeding coke breeze or the equivalent to the mixing zone 506 to further increase the temperature of the mixing zone 506 to about 900° C. A start-up heater 528 can also be used to heat the mixing zone to a desired start-up temperature.

In one or more embodiments, the operating temperature of the gasifier 500 can be controlled by the recirculation rate and residence time of the solids within the riser 508, by reducing the temperature of the ash prior to recycle to the mixing zone 506, by the addition of steam to the mixing zone 506, and/or by the addition of oxidant to the mixing zone 506. The recirculating solids also can heat the incoming feedstock which can also minimize tar formation.

In one or more embodiments, the mixing zone 506 can be operated at pressures from about 50 kPa to about 4,500 kPa to increase thermal output per unit reactor cross-sectional area and enhance energy output in any subsequent power cycle. In one or more embodiments, the mixing zone 506 can be operated at pressures from about 700 kPa to about 3,800 kPa, about 700 kPa to about 3,100 kPa, or about 700 kPa to about 2,400 kPa.

The gas suspension moves upward through the mixing zone 506 into the riser 508 where additional residence time allows the char gasification, methane/steam reforming, tar cracking, and/or water-gas shift reactions to occur. The riser 508 can operate at a higher temperature than the mixing zone 506, and can have a smaller diameter or cross-sectional area than the mixing zone 506. In one or more embodiments, the superficial gas velocity in the riser 508 can range from about 3 m/s to about 30 m/s, from about 6 m/s to about 25 m/s, from about 9 m/s to about 20 m/s, or from about 12 m/s to about 16 m/s. Suitable temperatures in the riser 508 can range from about 300° C. to about 1,000° C.

The gas mixture exits the riser 508 and enters the disengagers 510, 512 where at least a portion of the particulates can be separated from the gas and recycled back to the mixing zone 506 via one or more conduits, including, but not limited to, a standpipe 516, and/or j-leg 518. In one or more embodiments, the disengagers 510, 512 can be cyclones. In one or more embodiments, one or more particulate transfer devices 520, such as one or more loop seals, can be located downstream of the disengagers 510, 512 to collect the separated particulates.

The j-leg 518 can include a non-mechanical "j-valve" to increase the effective solids residence time, increase the carbon conversion, and/or minimize aeration requirements for recycling solids to the mixing zone 506. One or more nozzles (only four are shown: 120a,b,f,g; see FIG. 1) can be disposed within the gasifier 500. In one or more embodiments, the nozzles 120a,b,f,g can coupled to a fluid conveying structure 110, such as the j-leg 518, and configured to introduce a fluid, e.g., a gas, to fluidize the particulates flowing through the j-leg 518. In one or more embodiments, the gas can flow through the nozzles 120a,b,f,g at a rate ranging from a low of about 0.1 m/s, about 0.5 m/s, or about 1 m/s to a high of about 5 m/s, about 15 m/s, or about 25 m/s. In one or more embodiments, the gas can flow through the nozzles 120a,b,f,g at a rate ranging from a low of about 20 kg/hr, about 50 kg/hr, or about 100 kg/hr to a high of about 500 kg/hr, about 1,000 kg/hr, or about 2,000 kg/hr. In one or more embodiments, the pressure of the gas flowing through the nozzles 120a,b,f,g can range from a low of about 150 kPa, about 500 kPa, or about 1,000 kPa to a high of about 5,000 kPa, about 10,000 kPa, or about 70,000 kPa.

In one or more embodiments, the syngas produced in the gasifier 500 can include carbon monoxide, hydrogen, oxygen, hydrocarbons, sulfur, solids, mixtures thereof, derivatives thereof, or combinations thereof. In one or more embodiments, the syngas produced in the gasifier 500 can be essentially nitrogen-free. In one or more embodiments, the process converts at least about 85%, about 90%, about 95%, about 98%, or about 99% of the carbon from the feedstock to syngas.

In one or more embodiments, the syngas produced in the gasifier 500 can contain about 5 vol % to about 50 vol % carbon monoxide, about 15 vol % to about 40 vol % carbon monoxide, or about 20 vol % to about 30 vol % carbon monoxide. In one or more embodiments, the syngas can contain about 5 vol % to about 25 vol % hydrogen, about 10 vol % to about 25 vol % hydrogen, or about 10 vol % to about 20 vol % hydrogen. In one or more embodiments, the syngas can contain about 0.5 vol % to about 3.0 vol % nitrogen, about 0.5 vol % to about 2.0 vol % nitrogen, or about 1.5 vol % to about 3.0 vol % nitrogen. In one or more embodiments, the syngas can contain about 1 vol % to about 20 vol % methane, about 5 vol % to about 15 vol % methane, or about 5 vol % to about 10 vol % methane. In one or more embodiments, the syngas can contain less than about 30 vol % carbon dioxide, less than about 25 vol % carbon dioxide, less than about 20 vol % carbon dioxide, less than about 15 vol % carbon dioxide, or less than about 10 vol % carbon dioxide.

In one or more embodiments, the syngas gas leaving the gasifier 500 via line 526 can have a heating value, corrected for heat losses and dilution effects, of about 50 Btu/scf to about 75 Btu/scf, about 50 Btu/scf to about 100 Btu/scf, about 50 Btu/scf to about 110 Btu/scf, about 50 Btu/scf to about 140 Btu/scf, about 50 Btu/scf to about 180 Btu/scf, about 50 Btu/scf to about 200 Btu/scf, about 50 Btu/scf to about 250 Btu/scf, or about 50 Btu/scf to about 275 Btu/scf.

Steam can be supplied to the gasifier 500 to control the hydrogen to carbon monoxide ratio ($H_2$:CO) within the gasifier 500. Since the outlet temperature of the gasifier 500 is proportionately less than comparable gasifiers (i.e., slag type), the amount of thermal heat versus chemical heat in the syngas is comparably less in the gasifier 500. Therefore, steam can be used to adjust the $H_2$:CO ratio with a smaller energy penalty than other entrained flow gasifiers operating at higher temperatures. Because of the reduced operating temperature within the gasifier (i.e., less than 800° C.), less energy is consumed to control and optimize the $H_2$:CO ratio, thus the production of hydrogen can be increased without a commensurate increase in steam demand within the gasifier 200. For example, the synthesis gas leaving the gasifier 500 can have a $H_2$:CO of at least 0.2. In one or more embodiments, the $H_2$:CO ratio is between about 0.25 to about 2.5, between about 0.4 to about 2.0, between about 0.5 to about 1.5, or between about 0.8 to about 1.0.

Embodiments described herein further relate to any one or more of the following paragraphs:

1. A nozzle, comprising: a gas entry segment; a gas exit segment coupled to the gas entry segment, wherein a longitudinal axis of the gas exit segment is oriented at an angle of between about 70° and about 110° with respect to a longitudinal axis of the gas entry segment; and an access segment coupled to the gas entry segment and the gas exit segment, wherein a longitudinal axis of the access segment is substantially aligned with the longitudinal axis of the gas exit segment.

2. The nozzle of paragraph 1, wherein the angle between the gas entry segment and the gas exit segment is between about 80° and about 100°.

3. The nozzle of paragraph 2, wherein the angle between the gas entry segment and the gas exit segment is about 90°.

4. The nozzle according to any one of paragraphs 1 to 3, wherein the gas exit segment has a length to inner cross-sectional width ratio of less than about 12:1.

5. The nozzle of paragraph 4, wherein the inner cross-sectional width is a diameter.

6. The nozzle of paragraph 5, wherein the gas exit segment has a length to diameter ratio of less than about 6:1.

7. The nozzle according to any one of paragraphs 1 to 6, wherein a length of the gas exit segment is less than about 15 cm.

8. The nozzle of paragraph 7, wherein an inner cross-sectional width of the gas exit segment is less than about 5 cm.

9. The nozzle according to any one of paragraphs 1 to 8, wherein the nozzle is made from an 800H steel alloy.

10. A system for fluidizing particulates in a fluid/particulate mixture, comprising: a fluid conveying structure configured to transport a fluid/particulate mixture therethrough, the fluid conveying structure including a pressure shell and a refractory layer disposed on an inner surface of the pressure shell; and a nozzle coupled to the fluid conveying structure and configured to introduce a fluid into the fluid/particulate mixture, the nozzle comprising: a gas entry segment extending through the pressure shell from a first end located outside the pressure shell to a second end located inside the pressure shell, wherein the first end is located level with or above the second end, with respect to horizontal: a gas exit segment coupled to the second end of the gas entry segment; and an access segment extending through the pressure shell and coupled to the second end of the gas entry segment and the gas exit segment, wherein the access segment is substantially aligned with the gas exit segment.

11. The system of paragraph 10, wherein a longitudinal axis of the gas entry segment is oriented at an angle of between about 0° and 45°, with respect to horizontal.

12. The system of paragraph 10 or 11, wherein the gas exit segment is disposed in a lower portion of the fluid conveying structure.

13. The system of paragraph 12, wherein a longitudinal axis of the gas exit segment is oriented at an angle of between about 0° and about 45°, with respect to vertical.

14. The system of paragraph 13, wherein the longitudinal axis of the gas exit segment is oriented at an angle of between about 80° and about 100° with respect to a longitudinal axis of the gas entry segment.

15. The system according to any one of paragraph 10 to 14, wherein an innermost end of the gas exit segment is flush with an inner surface of the refractory layer.

16. The system according to any one of paragraph 10 to 15, wherein the refractory layer defines a hole that extends from an innermost end of the gas exit segment to an inner surface of the refractory layer, and wherein the hole is aligned with the gas exit segment.

17. The system according to any one of paragraph 10 to 16, wherein the gas exit segment has a length to inner cross-sectional width ratio of less than about 4:1.

18. The system according to any one of paragraph 10 to 17, wherein the fluid conveying structure is part of a gasifier.

19. A method for fluidizing particulates in a fluid/particulate mixture, comprising: transporting a fluid/particulate mixture through a fluid conveying structure having an outer pressure shell; introducing a process fluid to a first end of a gas entry segment, wherein the first end is in fluid communication with an exterior of the pressure shell; transporting the process fluid from the first end to a second end of the gas entry segment, wherein the second end is located inside the pressure shell, and wherein the first end is located level with or above the second end, with respect to horizontal; and transporting the process fluid from the second end of the gas entry segment to the fluid/particulate mixture via the gas exit segment, wherein the second end is coupled to the gas exit segment.

20. The method according to paragraph 19, further comprising: introducing an ejection fluid to the first end of the gas entry segment when a particulate blockage is disposed within the gas exit segment; and blowing the particulate blockage back into the fluid/particulate mixture with the ejection fluid.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A nozzle, comprising:
a gas entry segment;
a gas exit segment coupled to the gas entry segment, wherein a longitudinal axis of the gas exit segment is oriented at an angle of between about 70° and about 110° with respect to a longitudinal axis of the gas entry segment; and
an access segment coupled to the gas entry segment and the gas exit segment,
wherein a longitudinal axis of the access segment is substantially aligned with the longitudinal axis of the gas exit segment,
wherein a first end of the access segment is coupled to a flange and a second end of the access segment is coupled to the gas entry segment and the gas exit segment, and
wherein the flange closes the first end of the access segment.

2. A nozzle, comprising:
a gas entry segment;
a gas exit segment coupled to the gas entry segment, wherein a longitudinal axis of the gas exit segment is oriented at an angle of between about 70° and about 110° with respect to a longitudinal axis of the gas entry segment; and
an access segment coupled to the gas entry segment and the gas exit segment,
wherein a longitudinal axis of the access segment is substantially aligned with the longitudinal axis of the gas exit segment,
wherein a first end of the access segment is coupled to a flange and a second end of the access segment is coupled to the gas entry segment and the gas exit segment,
wherein the flange is a blind flange configured to close the first end of the access segment, and
wherein a removable plug or a removable stopper is at least partially disposed within the access segment.

3. A nozzle, comprising:
a gas entry segment;
a gas exit segment coupled to the gas entry segment, wherein a longitudinal axis of the gas exit segment is oriented at an angle of between about 80° and about 100° with respect to a longitudinal axis of the gas entry segment; and
an access segment coupled to the gas entry segment and the gas exit segment, wherein a longitudinal axis of the access segment is substantially aligned with the longitudinal axis of the gas exit segment,
wherein the nozzle is made from a metal and adapted to withstand a pressure of about 3,000 kPa to about 70,000 kPa,
wherein the gas exit segment has a length to inner cross-sectional width ratio of less than about 6:1,
wherein a length of the gas exit segment is less than about 15 cm and the inner cross-sectional width of the gas exit segment is less than about 5 cm,
wherein a first end of the access segment is coupled to a flange, a second end of the access segment is coupled to the gas entry segment and the gas exit segment, and a removable plug or a removable stopper is at least partially disposed within the access segment,
wherein the flange is a blind flange configured to close the first end of the access segment, and
wherein the removable plug or the removable stopper is disposed within the access segment and extends from the first end to the second end of the access segment.

4. The nozzle of claim 3, wherein an innermost end of the gas exit segment is flush with an inner surface of a refractory layer disposed on an inner surface of a pressure shell.

5. A pressure vessel comprising a pressure shell, a nozzle, and a refractory liner disposed on at least a portion of an inner surface of the pressure shell, the nozzle comprising:
a gas entry segment;
a gas exit segment coupled to the gas entry segment, wherein a longitudinal axis of the as exit segment is oriented at an angle of between about 80° and about 100° with respect to a longitudinal axis of the gas entry segment; and
an access segment coupled to the gas entry segment and the gas exit segment, wherein a longitudinal axis of the access segment is substantially aligned with the longitudinal axis of the gas exit segment,
wherein the nozzle is made from a metal and adapted to withstand a pressure of about 3,000 kPa to about 70,000 kPa.
wherein the gas exit segment has a length to inner cross-sectional width ratio of less than about 6:1,
wherein a length of the gas exit segment is less than about 15 cm and the inner cross-sectional width of the gas exit segment is less than about 5 cm,
wherein a first end of the access segment is coupled to a flange, a second end of the access segment is coupled to the gas entry segment and the gas exit segment. and a removable plug or a removable stopper is at least partially disposed within the access segment,
wherein the flange is a blind flange configured to close the first end of the access segment,
wherein the removable plug or the removable stopper is disposed within the access segment and extends from the first end to the second end of the access segment and
wherein the refractory layer defines a hole that extends from an innermost end of the gas exit segment to an inner surface of the refractory layer, and wherein the hole is aligned with the gas exit segment.

6. The nozzle of claim 3, wherein the nozzle is made from a steel alloy.

7. The nozzle of claim 1, wherein an innermost end of the gas exit segment is flush with an inner surface of a refractory layer disposed on an inner surface of a pressure shell.

8. The nozzle of claim 1, further comprising a refractory layer disposed on an inner surface of a pressure shell, wherein the refractory layer defines a hole that extends from an innermost end of the gas exit segment to an inner surface of the refractory layer, and wherein the hole is aligned with the gas exit segment.

9. The nozzle of claim 1, wherein the nozzle is made from a metal and adapted to withstand a pressure of about 3,000 kPa to about 70,000 kPa.

10. The nozzle of claim 1, wherein the gas exit segment has a length to inner cross-sectional width ratio of less than 6:1.

11. The nozzle of claim 1, wherein a length of the gas exit segment is less than 15cm and the inner cross-sectional width of the gas exit segment is less than 5 cm.

12. The nozzle of claim 1, wherein the gas exit segment has a length to inner cross-sectional width ratio of less than 6:1, and wherein a length of the gas exit segment is less than 15 cm and the inner cross-sectional width of the gas exit segment is less than 5 cm.

13. The nozzle of claim 1, wherein the nozzle is made from a metal and adapted to withstand a pressure of about 3,000 kPa to about 70,000 kPa, wherein the gas exit segment has a length to inner cross-sectional width ratio of less than 6:1, and wherein a length of the gas exit segment is less than 15 cm and the inner cross-sectional width of the gas exit segment is less than 5 cm.

14. The nozzle of claim 1, wherein the nozzle is made from a metal and adapted to withstand a pressure of about 3,000 kPa to about 70,000 kPa, wherein the gas exit segment has a length to inner cross-sectional width ratio of less than 12:1, and wherein a length of the gas exit segment is less than 60 cm and the inner cross-sectional width of the gas exit segment is less than 15 cm.

15. The nozzle of claim 2, wherein the removable plug or the removable stopper is disposed within the access segment and extends from the first end to the second end of the access segment.

16. The nozzle of claim 2, wherein an innermost end of the gas exit segment is flush with an inner surface of a refractory layer disposed on an inner surface of a pressure shell.

17. The nozzle of claim 2, further comprising a refractory layer disposed on an inner surface of a pressure shell, wherein the refractory layer defines a hole that extends from an innermost end of the gas exit segment to an inner surface of the refractory layer, and wherein the hole is aligned with the gas exit segment.

18. The nozzle of claim 2, wherein the gas exit segment has a length to inner cross-sectional width ratio of less than 6:1, and wherein a length of the gas exit segment is less than 15 cm and the inner cross-sectional width of the gas exit segment is less than 5 cm.

19. The nozzle of claim 2, wherein the nozzle is made from a metal and adapted to withstand a pressure of about 3,000 kPa to about 70,000 kPa, wherein the gas exit segment has a length to inner cross-sectional width ratio of less than 6:1, and wherein a length of the gas exit segment is less than 15 cm and the inner cross-sectional width of the gas exit segment is less than 5 cm.

20. The nozzle of claim 2, wherein the nozzle is made from a metal and adapted to withstand a pressure of about 3,000 kPa to about 70,000 kPa, wherein the gas exit segment has a length to inner cross-sectional width ratio of less than 12:1, and wherein a length of the gas exit segment is less than 60 cm and the inner cross-sectional width of the gas exit segment is less than 15 cm.

21. The pressure vessel of claim 5, wherein an innermost end of the gas exit segment is flush with an inner surface of the refractory layer.

* * * * *